United States Patent [19]

Dawley

[11] 4,200,897
[45] Apr. 29, 1980

[54] GROUND LEAKAGE CURRENT INTERRUPTER

[76] Inventor: Robert E. Dawley, 123 Bacon St., Natick, Mass. 01760

[21] Appl. No.: 906,247

[22] Filed: May 15, 1978

[51] Int. Cl.² ............................................. H02H 3/28
[52] U.S. Cl. ..................................... 361/45; 361/110
[58] Field of Search ...................... 361/45, 44, 46-50, 361/42, 110, 111, 93, 94, 95, 96

[56] References Cited
U.S. PATENT DOCUMENTS

| | | | |
|---|---|---|---|
| 3,736,468 | 5/1973 | Reeves et al. | 361/45 |
| 3,914,667 | 10/1975 | Waldron | 361/94 |
| 4,024,435 | 5/1977 | Gross | 361/45 |
| 4,138,707 | 2/1979 | Gross | 361/45 |

*Primary Examiner*—Patrick R. Salce
*Attorney, Agent, or Firm*—John E. Toupal

[57] ABSTRACT

A ground leakage current interrupter circuit including a transformer having a pair of balanced differential primary windings and a secondary winding, a fault detector for monitoring the output of the secondary winding and producing a fault signal in response to increases in the level of the secondary winding output that occur at greater than a predetermined rate, and a circuit interrupter responsive to the fault signal produced by the fault detector. Preferably, the fault detector includes a level detector for producing the fault signal in response to secondary winding output levels greater than a reference signal level, and a reference supply that varies the reference signal level in dependence upon the level of the secondary winding output so as to prevent production of a fault signal in response to increases in the secondary winding output that occur at less than the predetermined rate.

17 Claims, 1 Drawing Figure

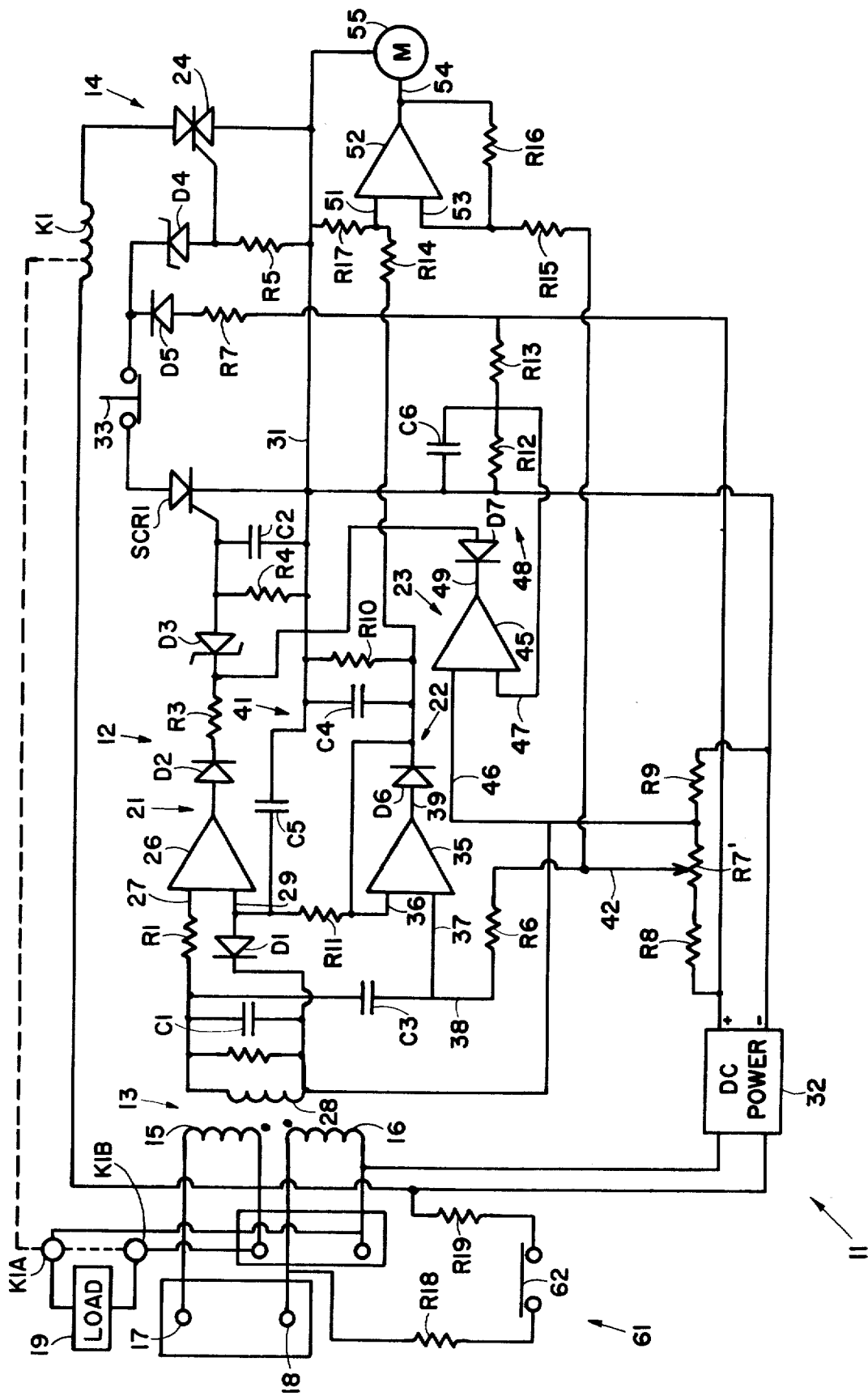

GROUND LEAKAGE CURRENT INTERRUPTER

BACKGROUND OF THE INVENTION

This invention relates generally to a ground leakage current responsive circuit interrupter and, more particularly, to such an interrupter that distinguishes between dangerous fault currents and acceptable residual leakage currents.

All electrical equipment powered by standard power sources of over 35 volts is capable of supplying sufficient electrical energy to give severe and lethal shocks. A hazardous electrical shock occurs at any time more than five milliamps of current is conducted through a person's body. The risk of shock is dependent upon the magnitude of the power sources involved and is substantially increased by wetness in the area of equipment usage. Most usually, a hazardous shock occurs when a person is in contact with a ground source such as a body of water or wet ground or grounded metal pipes, frames, etc., and makes additional contact with a potential source capable of supplying hazardous electrical current. A source can include, for example, electrical equipment that establishes a substantial current leakage path or a hot power line with which a person inadvertently comes into contact. Such contact can result from the careless removal of protective insulator covers, bypassing safety interlocks or tampering with safety grounding. Other potential sources of lethal currents, not commonly considered, are tools and appliances that are accidentally dropped into a body of water. Regardless of how well they are insulated, motors require ventilation openings that permit water access and result in the application of line potential to the water body.

Protection against electrical shock is generally provided by ground fault circuit interrupters designed to activate a tripping circuit in response to leakage currents of about five milliamps. These devices customarily include a differential transformer having a single core with two or more primary windings, each winding being connected in one of the conductors supplying the load to be protected. The primary windings are so wound that they produce in the core magnetic fields which oppose one another. A secondary winding is also provided on the core and suitable circuitry is provided such that, when a voltage develops across the secondary winding, it will open a circuit interrupter in the supply conductors. Under normal conditions, the currents in the supply conductors and the primary windings are equal. Thus, the resultant flux produced in the core by the primary windings is zero and no voltage is developed across the secondary winding. However, when a separate path to ground is established—as, for example, through a human body—the currents in the primary windings will immediately become unbalanced. A resultant flux is then produced in the transformer core which induces a voltage across the secondary winding. This voltage thereupon actuates the tripping circuit which opens the circuit interrupter and disconnects the load from the power supply.

Ground fault circuit interrupters, however, exhibit a number of serious disadvantages. One problem stems from the presence of residual leakage current resulting from electrical equipment design that produces a continuous electrical path between a power line and earth ground. Large electrical equipment often exhibits residual leakage exceeding five milliamps and consequently cannot be equipped with conventional ground fault protective equipment. Another problem frequently occurs on construction sites on which a single interrupter is shared by a plurality of electrical tools. The total residual leakage of the multiple tools can easily exceed a protective unit's threshold and cause "nuisance tripping". This latter factor discourages the use of a single ground fault interrupter to protect an entire house, apartment, construction site, etc., and because of the cost involved in providing multiple protective interrupters such facilities generally are unprotected.

The object of this invention, therefore, is to provide an improved ground leakage current interrupter that can distinguish between hazardous fault current and acceptable residual leakage currents.

SUMMARY OF THE INVENTION

The invention is a ground leakage current interrupter circuit including a transformer having a pair of balanced differential primary windings and a secondary winding, a fault detector for monitoring the output of the secondary winding and producing a fault signal in response to increases in the level of the secondary winding output that occur at greater than a predetermined rate, and a circuit interrupter responsive to the fault signal produced by the fault detector. Preferably, the fault detector includes a level detector for producing the fault signal in response to secondary winding output levels greater than a reference signal level, and a reference supply that varies the reference signal level in dependence upon the level of the secondary winding output so as to prevent production of a fault signal in response to increases in the secondary winding output that occur at less than the predetermined rate. The use of a fault detector responsive to rate of leakage current increase permits the interrupter to distinguish between rapidly increasing dangerous fault currents and gradually increasing acceptable residual leakage currents.

In a featured embodiment of the invention, the reference supply includes an adjustable reference providing a first component of the reference signal level, a variable reference providing a second compartment of the reference signal level dependent upon the level of the secondary winding output and a rate-of-change detector for disabling the variable reference in response to increases in the level of the secondary winding output occurring at greater than the predetermined rate. Preferably, the reference supply includes a reference differential amplifier having first and second inputs receiving the adjustable first reference component and the output of the secondary winding and operating as a peak detector to produce the reference signal level equal to the sum of its inputs. Receiving the reference signal level from the reference differential amplifier is a detector differential amplifier that also receives the secondary winding output and produces the fault signal in response to a secondary winding output greater than the reference signal level. The rate-of-change detector is a delay circuit that delays the transmission of changes in the second reference component to the detector amplifier and thereby prevents its activation by gradual increases in the output of the secondary winding.

One feature of the invention is the provision of an amplitude responsive circuit for causing the fault detector to produce the fault signal in response to an increase in the level of the secondary winding output to above a predetermined amplitude. The amplitude detector causes a response by the fault detector to increases in total residual leakage currents to above some predetermined safe limit.

Another feature of the invention is the provision of a turn-on delay circuit that de-activates the fault detector to prevent the production of a fault signal for a predetermined time after the fault detector's power supply is energized. The turn-on delay prevents false activation of the fault detector by transient leakage currents produced upon initial energization of electrical systems having a large amount of stray leakage capacitance.

Still another feature of the invention is a fault test circuit for selectively producing in the secondary winding an output increase at above the predetermined rate. The fault test circuit permits selective testing of the integrity of the interrupter.

DESCRIPTION OF THE DRAWING

These and other objects and features of the invention will become more apparent upon a perusal of the following description taken in conjunction with the accompanying drawing which is a schematic circuit diagram of the invention.

DESCRIPTION OF THE PREFERRED EMBODIMENT

Referring now to the drawing there is schematically illustrated a ground leakage current interrupter circuit 11 according to the present invention. Forming the circuit 11 is a fault detector circuit 12 that monitors a ground leakage current dependent output of a transformer 13 and supplies under certain conditions a fault signal to a current interrupter 14. The transformer 13 includes a pair of balance differential primary windings 15, 16 connected between a pair of power line terminals 17 and 18 and a line load 19. Included in the fault detector circuit 12 are a level detector circuit 21, a reference supply circuit 22 and a turn-on delay circuit 23 all of which are described in greater detail below. The current interrupter 14 comprises a thyristor 24, a relay winding K1 connected for energization thereby and a corresponding pair of circuit breakers K1A and K1B connecting the power lines 17, 18 to the load 19.

The level detector circuit 21 includes a differential detector amplifier 26 having a first input 27 that receives the output of the secondary winding 28 of the transformer 13 and a second input 29 that receives a reference suply 22. Connecting the secondary winding 28 to the amplifier 26 are a resistor R1 and a diode D1 while a filter network including a capacitor C1 and a resistor R2 is connected across the secondary winding 28. Also included in the level detector 21 are a diode D2, a resistor R3 and a zener diode D3 that connect the output of the amplifier 26 to the gate electrode of a silicon controlled rectifier SCR1. The parallel combination of a resistor R4 and a capacitor C2 is connected between the gate electrode of the rectifier SCR1 and a circuit common 31. A bias circuit for the thyristor 24 includes a zener diode D4 and a resistor R5 connected between the rectifier SCR1 and the circuit common 31 and a diode D5 and a resistor R7 connected between the SCR1 and a DC power supply 32. The junction between the diode D4 and the resistor R5 is connected to the gate electrode of the thyristor 24 while a de-activating manually operated switch 33 connects the rectifier SCR1 to the thyristor bias circuit.

Included in the reference supply 22 is a differential reference amplifier 35 having a pair of inputs 36, 37 that receive both the output of the secondary winding 28 and a bias reference on a line 38 and produces on an output 39 a reference signal equal to the sum thereof. The reference output 39 is applied by a rate-of-change detector circuit 41 to the second input 29 of the detector amplifier 26. Providing the reference on line 38 through a resistor R6 is an adjustable tap 42 of a reference resistor R7 connected in series with resistors R8 and R9 across the DC power supply 32. The rate-of-change detector 41 includes a peak detector formed by a diode D6, a capacitor C4 and a resistor R10 and an integrator network formed by a capacitor C5 and a resistor R11.

The turn-on delay circuit 23 includes an amplifier 45 having one input 46 connected to the junction between the resistors R7 and R9. Another input 47 of the amplifier 45 is connected to a bias delay circuit 48 formed by a capacitor C6 and resistors R12 and R13. The output 49 of the amplifier 45 is applied through a diode D7 to a junction in the output of the detector amplifier 26 between the resistor R3 and the diode D3.

OPERATION

When no ground leakage currents exist in the circuit between the power lines 17, 18 and the load 19, the output of the transformer 13 is zero, except for any small unbalances that may exist. However, when ground leakage currents occur, the transformer 13 becomes unbalanced and an output voltage proportional to the magnitude of the unbalance appears on the secondary winding 28. That output is applied to the input 27 of the detector amplifier 26 which produces an output fault signal only if the input 27 exceeds the reference level on the input 29. The output of the secondary winding 28 also is applied together with the reference signal on the line 38 to the reference amplifier 35 that provides a reference output signal 39 equal to the sum thereof. Thus, the reference signal output 39 is composed of a first variable reference component dependent upon the output of the secondary winding 28 and an adjustably fixed second reference component established by the setting of the tap 42 on the reference resistor R7. That setting is selected to establish for the adjustable reference on line 38 the desired fault current detection level for the interrupter circuit 11.

When no signal is present on the secondary winding 28 the output 39 of the reference amplifier 35 is equal to the adjustable DC reference on line 38 and is applied to the input 29 of the detector amplifier 26. However, when a leakage current indicating output appears on the secondary winding 28, it is applied to the reference amplifier 35 which acts as a peak detector and raises the output 39 equal to the sum of the peak value of the secondary winding output and the DC bias on line 38. Thus, the reference input 29 is constantly adjusted to reflect increases in the ground leakage current represented by the output of the secondary winding 28. Increases in the output of the secondary winding 28 appearing at the output 39 of the reference amplifier 35, however, require a finite time to charge the peak detector D6, C4, R10 and are further delayed by the integrator C5, R11 before reaching the input 29 of the detector amplifier 26. Provided the increases occur at below a predetermined rate, the increasing reference level on input 29 compensates for the secondary winding increase appearing on input 27 and thereby prevents the occurrence of a differential voltage that will trigger a fault signal output by the detector amplifier 26. However, in response to an increase in the output of the secondary winding 28 having greater than a predetermined rate established by the rate-of-change detector circuit 41 and an amplitude greater than the level established by the bias reference on line 38, the reference input 29 will not reflect the secondary winding increase before it is applied to the input 27 and the detector amplifier 26 produces a fault signal output. Such a rapid increase in the secondary winding output would occur, for example, if a grounded person touched a power line. In response to a fault signal output from the detector amplifier 26, the rectifier SCR1 establishes a conductive bias for the thyristor 24 which in turn supplies energizing current to the winding K1 to open the circuit breakers K1A and K1B. Thus, the reference amplifier 35 supplies in addition to the adjustably fixed reference component on line 38 a variable reference component dependent upon the secondary winding output and that variable reference is prevented from reaching the input 29 or is in effect disabled by the rate-of-change detector circuit 41 in response to increases in the secondary winding output occurring at greater than a predetermined rate.

Also receiving the reference amplifier output 39 through a resistor R14 is an input 51 of a differential amplifier 52. The other input 53 of the amplifier 52 receives the bias reference from the resistor R7 through a resistor R15. An output 54 of the amplifier 52 is connected to the input 53 by a resistor R16 while a resistor R17 connects the input 51 to circuit common 31. The output 54 of the differential amplifier 52 is equal to an amplified difference between the inputs 51 and 53 which, of course, represents the output of the secondary winding 28. That output level is directly dependent upon the magnitude of leakage current in the system being monitored and is indicated by a meter 55.

As described above, the reference applied to the input 29 of the detector amplifier 26 is continuously varied to prevent the production of a fault signal in response to acceptable ground leakage current. However, even expected or normal ground leakage current levels in a given system should not increase to above a safe predetermined magnitude. Protection against this hazard is provided by the amplitude detector diode D1. When residual leakage current increases, the DC potential difference between the inputs 27 and 29 of the detector amplifier 26 also increases. This is a linear increase until the input signal from the secondary winding 28 reaches a level that causes the diode D1 to begin conduction. That conduction causes the AC signal peak on input 27 to increase at a higher rate than the DC level occurring on the input 29. Finally, if the peak at the input 27 exceeds the level at the input 29, a fault is recognized and the detector amplifier 26 produces a fault signal to open the breakers K1A and K1B.

Another problem is found in certain systems such as large system cable runs that exhibit a large amount of stray leakage capacitance. Upon start-up of such systems, a normally high magnitude of ground leakage current could cause an unnecessary response by the detector amplifier 26 and nuisance tripping of the breakers K1A and K1B. Protection against such an event is provided by the turn-on delay circuit 23. When the DC power supply 32 is energized, the input 46 of the amplifier 45 receives undelayed bias while the input 47 receives a bias delayed by the delay network C6, R12 and R13. This causes the amplifier 45 to produce a signal across the diode D7 that holds the junction between the resistor R3 and the diode D3 at a low level to prevent the detector amplifier 26 from applying a fault signal to the rectifier SCR1. After a transient turn-on period has passed, however, the bias on input 47 reaches a level that turns off the amplifier 45 to disconnect the diode D7 and permit normal operation of the level detector 21.

The above-described turn-on delay is not effective in those situations wherein load units are added randomly to a system after power is already applied and an initial transient delay period has passed. If such randomly added loads produce transient start-up ground leakage that exceeds the detection level of the detector amplifier 26 an unnecessary fault signal would be generated. To prevent such an occurrence, the manual switch 33 can be opened to de-activate the fault detector 12 during the period that a load is being added. In addition, the manual switch 33 functions as a reset mechanism. After a detected fault has occurred to open the breakers K1A and K1B, operation of the switch 33 resets the rectifier SCR1, allowing a restoration of power.

The integrity of the circuit 11 can be tested by operation of a fault test circuit 61 that includes a resistor R18, a resistor R19 and a normally open manual switch 62, all connected in series across with the primary winding 15 of the transformer 13. Closure of the switch 62 circulates through the primary winding 15 an unbalanced current that produces an output in the secondary winding 28. The level of the signal produced in the secondary winding 28 is sufficient to activate the detector amplifier 26 producing a fault signal that opens the breakers K1A and K1B thereby proving the integrity of the fault detector circuit 11.

Values of the components depicted in the drawing are as follows:

Resistor 1—120K ohms
Resistor 2—5.6K ohms
Resistor 3—1K ohms
Resistor 4—33K ohms
Resistor 5—12K ohms
Resistor 6—120K ohms
Resistor 7—1K ohms
Resistor 7'—100 ohms
Resistor 8—33K ohms
Resistor 9—3.3K ohms
Resistor 10—120K ohms
Resistor 11—120K ohms
Resistor 12—4.7M ohms
Resistor 13—1M ohms
Resistor 14—1M ohms
Resistor 15—1M ohms
Resistor 16—20K ohms
Resistor 17—20K ohms
Resistor 18—9.1K ohms
Resistor 19—9.1K ohms
Capacitor 1—0.02uf
Capacitor 2—4.7uf
Capacitor 3—0.22uf
Capacitor 4—10uf
Capacitor 5—0.1uf
Capacitor 6—10uf
Diode 1—1N914
Diode 2—1N914
Diode 3—5.1 volt
Diode 4—5.1 volt
Diode 5—LED
Diode 6—1N914
Diode 7—1N914
Amplifier 26—324
Amplifier 35—324

Amplifier 45—324
Rectifier SCR1—MCR101
Thyristor 24—TR1AC

Obviously, many modifications and variations of the present invention are possible in light of the above teachings. For example, by utilizing more than a single pair of balanced primary windings, the invention can be advantageously employed in systems having multiple load lines. It is to be understood, therefore, that the invention can be practiced otherwise than as specifically described.

What is claimed is:

1. A ground leakage current interrupter circuit comprising:
    a transformer having a pair of balanced differential primary windings and a secondary winding;
    fault detector means monitoring the output of said secondary winding, said fault detector means producing a fault signal in response to increases in the level of said output that occur at greater than a predetermined rate;
    circuit interrupter means responsive to a fault signal produced by said fault detector means;
    a power supply means for said fault detector means; and
    a turn-on delay means for de-activating said fault detector means to prevent the production of a fault signal for a predetermined time after energization of said power supply means.

2. A circuit according to claim 1 wherein said fault detector means comprises amplitude detector means for causing said fault detector means to produce said fault signal in response to an increase in the level of said secondary winding output to above a predetermined amplitude.

3. A circuit according to claim 1 including fault test means for selectively producing in said secondary winding an output level increase at above said predetermined rate.

4. A circuit according to claim 3 including manually operated de-activation means for momentarily de-activating said fault detector means to prevent production of a fault signal thereby.

5. A ground leakage current interrupter circuit comprising:
    a transformer having a pair of balanced differential primary windings and a secondary winding;
    fault detector means monitoring the output of said secondary winding and producing a fault signal in response to increases in the level of said output that occur at greater than a predetermined rate, said fault detector means comprising a level detector means monitoring said output of said secondary winding and producing said fault signal in response to a secondary winding output level greater than a reference signal level and a reference supply means supplying said reference signal level to said level detector means, said reference supply means varying said reference signal level in dependence upon the level of said secondary winding output so as to prevent the production of said fault signal in response to increases in said secondary winding output that occur at less than said predetermined rate; and
    circuit interrupter means responsive to a fault signal produced by said fault detector means.

6. A circuit according to claim 5 wherein said fault detector means comprises amplitude detector means for causing said fault detector means to produce said fault signal in response to an increase in the level of said secondary winding output to above a predetermined amplitude.

7. A circuit according to claim 5 wherein said reference supply means comprises:
    an adjustable reference means providing a first component of said reference signal level;
    a variable reference means providing a second component of said reference signal level dependent upon the level of said output; and
    rate-of-change detector means for disabling said variable reference means in response to increases in the level of said output occurring at greater than said predetermined rate.

8. A circuit according to claim 7 wherein said fault detector means comprises amplitude detector means for causing said fault detector means to produce said fault signal in response to an increase in the level of said secondary winding output to above a predetermined amplitude.

9. A circuit according to claim 7 wherein said rate-of-change detector means comprises signal delay means for delaying the transmission of level changes in said second component to said level detector means.

10. A circuit according to claim 9 wherein said reference supply means comprises a reference differential amplifier having a first and second input connected to receive said first component of said reference signal level and said output of said secondary winding; said reference amplifier operating as a peak detector and producing on an output said reference signal level equal to the sum of said first component and the peak of said secondary winding output.

11. A circuit according to claim 10 wherein said level detector means comprises a detector differential amplifier having a first input connected to receive secondary winding output, a second input connected to receive said reference signal level from said reference differential amplifier, and an output producing said fault signal in response to a secondary winding output greater than said reference signal level.

12. A circuit according to claim 11 wherein said rate-of-change detector means comprises a delay circuit means connected between said reference amplifier output and said second input of said detector amplifier, said circuit delay means delaying the transmission of changes in said second component of said reference signal level to said detector amplifier.

13. A circuit according to claim 12 wherein said fault detector means comprises amplitude detector means for causing said fault detector means to produce said fault signal in response to an increase in the level of said secondary winding output to above a predetermined amplitude.

14. A circuit according to claim 13 wherein said amplitude detector means comprises means for reducing the DC potential difference between said first and second inputs of said detector amplifier in response to a reference signal level greater than a given level.

15. A circuit according to claim 14 including a power supply means for said fault detector means, and a turn-on delay means for de-activating said fault detector means to prevent the production of a fault signal for a predetermined time after energization of said power supply means.

16. A circuit according to claim 15 wherein said level detector means comprises a silicon controlled rectifier rendered conductive by an output from said detector amplifier to produce said fault signal, and said turn-on delay means disables said silicon controlled rectifier during said predetermined time.

17. A circuit according to claim 16 including fault test means for selectively producing in said secondary winding an output level increase at above said predetermined rate.

* * * * *